United States Patent
Simon et al.

(10) Patent No.: US 7,295,999 B1
(45) Date of Patent: Nov. 13, 2007

(54) SYSTEM AND METHOD FOR DETERMINING ELIGIBILITY AND ENROLLING MEMBERS IN VARIOUS PROGRAMS

(75) Inventors: Scott H. Simon, Wilmington, DE (US); Nancy W. Woodall, Earleville, MD (US); Michael F. Nikithser, Pittsburgh, PA (US); Jon K. Forst, Annapolis, MD (US); Gregory Shields, Washington, DC (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/739,880

(22) Filed: Dec. 20, 2000
(Under 37 CFR 1.47)

(51) Int. Cl.
G06Q 40/00 (2006.01)
(52) U.S. Cl. .................... 705/36 R; 705/35
(58) Field of Classification Search ............ 705/35–40, 705/80
See application file for complete search history.

(56) References Cited

U.S. PATENT DOCUMENTS

| | | |
|---|---|---|
| 3,634,669 A | 1/1972 | Spontak |
| 4,598,367 A | 7/1986 | Freiman et al. |
| 4,642,768 A | 2/1987 | Roberts |
| 4,663,397 A | 5/1987 | Morita et al. ............... 364/406 |
| 4,694,397 A | 9/1987 | Grant et al. ................. 364/408 |
| 4,722,054 A | 1/1988 | Yorozu et al. .............. 364/401 |
| 4,736,294 A | 4/1988 | Le Grand et al. |
| 4,739,478 A | 4/1988 | Finnerty et al. |
| 4,745,468 A | 5/1988 | Von Kohorn ................ 358/84 |
| 4,750,119 A | 6/1988 | Cohen et al. ................ 364/401 |
| 4,774,664 A | 9/1988 | Campbell et al. ........... 364/408 |
| 4,797,911 A | 1/1989 | Szlam et al. ................. 379/67 |
| 4,812,628 A | 3/1989 | Boston et al. .............. 235/380 |
| 4,831,526 A | 5/1989 | Luchs |
| 4,914,587 A | 4/1990 | Clouse ....................... 364/408 |
| 4,926,255 A | 5/1990 | Von Kohorn ............... 358/84 |
| 5,034,807 A | 7/1991 | Von Kohorn ............... 358/84 |
| 5,050,207 A | 9/1991 | Hitchcock ................... 379/96 |
| 5,057,915 A | 10/1991 | Von Kohorn ............... 358/84 |
| 5,157,717 A | 10/1992 | Hitchcock ................... 379/96 |
| 5,220,500 A | 6/1993 | Baird |

(Continued)

FOREIGN PATENT DOCUMENTS

JP 2002163589 A * 6/2002

(Continued)

OTHER PUBLICATIONS

University Registrar "Mission Statement" The Ohio State University, Copyright 1994-2003.*

(Continued)

*Primary Examiner*—Narayanswamy Subramanian
(74) *Attorney, Agent, or Firm*—Hunton & Williams, LLP (57) ABSTRACT

A system and method for determining eligibility of persons and enrolling those persons in various programs. For example, one embodiment is particularly suited for enrolling credit card members in payment programs. A program is selected, after which enrollment information is entered. The enrollment information is checked and verified, and the enrollment application is checked for eligibility. The enrollment may be either accepted or declined. The possibility of reiterative enrollment in more than one program is provided. A system is provided for tracking which payment programs are the most enticing for later feedback analysis.

11 Claims, 8 Drawing Sheets

U.S. PATENT DOCUMENTS

| | | | |
|---|---|---|---|
| 5,220,501 A * | 6/1993 | Lawlor et al. ................. | 705/40 |
| 5,225,978 A | 7/1993 | Petersen et al. ............. | 364/408 |
| 5,227,874 A | 7/1993 | Von Kohorn | |
| 5,260,778 A | 11/1993 | Kauffman et al. ............ | 358/86 |
| 5,287,269 A | 2/1994 | Dorrough et al. ............ | 364/408 |
| 5,383,113 A | 1/1995 | Kight et al. ................. | 364/401 |
| 5,402,474 A | 3/1995 | Miller et al. .................. | 379/93 |
| 5,481,647 A | 1/1996 | Brody | |
| 5,483,445 A | 1/1996 | Pickering ..................... | 364/406 |
| 5,523,942 A | 6/1996 | Tyler et al. .................. | 364/401 |
| 5,532,920 A | 7/1996 | Hartrick et al. ........... | 364/419.1 |
| 5,570,465 A | 10/1996 | Tsakanikas .................. | 395/114 |
| 5,583,759 A | 12/1996 | Geer ........................... | 395/245 |
| 5,583,778 A | 12/1996 | Wind | |
| 5,592,590 A | 1/1997 | Jolly | |
| 5,611,052 A | 3/1997 | Dykstra | |
| 5,649,116 A | 7/1997 | McCoy | |
| 5,652,786 A | 7/1997 | Rogers .................... | 379/91.01 |
| 5,655,085 A | 8/1997 | Ryan | |
| 5,659,165 A | 8/1997 | Jennings et al. ............. | 235/379 |
| 5,699,528 A | 12/1997 | Hogan ......................... | 395/240 |
| 5,715,298 A | 2/1998 | Rogers .................... | 379/91.01 |
| 5,715,450 A | 2/1998 | Ambrose et al. ........... | 395/614 |
| 5,717,865 A | 2/1998 | Stratmann | |
| 5,727,249 A | 3/1998 | Pollin .......................... | 705/40 |
| 5,732,397 A | 3/1998 | DeTore | |
| 5,742,775 A | 4/1998 | King .......................... | 395/238 |
| 5,765,144 A | 6/1998 | Larche | |
| 5,774,878 A | 6/1998 | Marshall | |
| 5,774,883 A | 6/1998 | Anderson | |
| 5,787,403 A | 7/1998 | Randle ........................ | 705/43 |
| 5,802,498 A | 9/1998 | Comesanas .................. | 705/34 |
| 5,826,241 A | 10/1998 | Stein et al. .................... | 705/26 |
| 5,832,447 A | 11/1998 | Rieker et al. .................. | 705/2 |
| 5,832,460 A | 11/1998 | Bednar et al. ................ | 705/27 |
| 5,835,087 A | 11/1998 | Herz et al. ................... | 345/327 |
| 5,835,580 A | 11/1998 | Fraser ......................... | 379/115 |
| 5,835,603 A | 11/1998 | Coutts et al. ................. | 380/49 |
| 5,842,211 A | 11/1998 | Horadan et al. .............. | 707/10 |
| 5,852,811 A | 12/1998 | Atkins | |
| 5,862,223 A | 1/1999 | Walker et al. ................. | 380/25 |
| 5,870,456 A | 2/1999 | Rogers .................... | 379/91.01 |
| 5,870,721 A | 2/1999 | Norris ......................... | 705/38 |
| 5,870,724 A | 2/1999 | Lawlor et al. ................ | 705/42 |
| 5,873,072 A | 2/1999 | Kight et al. .................. | 705/40 |
| 5,875,437 A | 2/1999 | Atkins | |
| 5,884,032 A | 3/1999 | Bateman et al. ....... | 395/200.34 |
| 5,884,288 A | 3/1999 | Chang et al. ................. | 705/40 |
| 5,897,625 A | 4/1999 | Gustin et al. ................. | 705/43 |
| 5,899,982 A | 5/1999 | Randle ........................ | 705/35 |
| 5,903,881 A | 5/1999 | Schrader et al. ............. | 705/42 |
| 5,913,202 A | 6/1999 | Motoyama | |
| 5,920,847 A | 7/1999 | Kolling et al. ................ | 705/40 |
| 5,920,848 A | 7/1999 | Schutzer | |
| 5,930,775 A | 7/1999 | McCauley | |
| 5,940,811 A | 8/1999 | Norris ......................... | 705/38 |
| 5,943,656 A | 8/1999 | Crooks et al. ................ | 705/30 |
| 5,966,698 A | 10/1999 | Pollin .......................... | 705/34 |
| 5,978,780 A | 11/1999 | Watson ........................ | 705/40 |
| 5,987,434 A | 11/1999 | Libman | |
| 5,991,750 A | 11/1999 | Watson ........................ | 705/44 |
| 5,995,948 A | 11/1999 | Whitford et al. ............. | 705/41 |
| 6,009,415 A | 12/1999 | Shurling | |
| 6,018,722 A | 1/2000 | Ray | |
| 6,021,397 A | 2/2000 | Jones | |
| 6,044,361 A * | 3/2000 | Kalagnanam et al. ......... | 705/28 |
| 6,088,686 A | 7/2000 | Walker | |
| 6,131,810 A * | 10/2000 | Weiss et al. .................. | 705/41 |
| 6,199,077 B1 | 3/2001 | Inala | |
| 6,202,053 B1 | 3/2001 | Christiansen | |
| 6,289,319 B1 * | 9/2001 | Lockwood .................... | 705/35 |
| 6,315,196 B1 * | 11/2001 | Bachman ...................... | 705/41 |
| 6,330,551 B1 * | 12/2001 | Burchetta et al. ............. | 705/80 |
| 6,347,333 B2 * | 2/2002 | Eisendrath et al. ......... | 709/217 |
| 6,496,202 B1 * | 12/2002 | Prinzing ..................... | 345/762 |
| 2002/0059139 A1 * | 5/2002 | Evans .......................... | 705/40 |
| 2003/0229582 A1 * | 12/2003 | Sherman et al. .............. | 705/38 |

FOREIGN PATENT DOCUMENTS

| | | | |
|---|---|---|---|
| WO | WO99/27479 | * | 6/1999 |

OTHER PUBLICATIONS

Promotional article for WingspanBank.com credit cardmembers, www.wingspanbank.com on Sep. 28, 1999.

Article from Financial Services Report, v8, n15, p. 1(4), Jul. 24, 1991, regarding Card issuers turn to scoring as they face increasing risk. (bank card evaluating their accounts).

Article from Information Today, Wednesday, Mar. 1, 1995, vol. 12, No. 3, ISSN: 8755-6286.

Article from Washington Post, Apr. 25, 1988, Business Section p. 6, "Credit Card Issuers Keeping a Closer Watch on How You Pay Bills", by Jane Bryant Quinn.

Article from Business Week, Feb. 27, 1995, "Cyberspace Crafting software that will let you build a business out there".

Article from The American Lawyer, Mar. 1995, "E-Cash: Can't Live With It, Can't Live Without It".

Article from Interfaces 22: Jan.-Feb. 1992, Managing Consumer Credit Delingquency in the Economy: A Multi-Billion Dollar Management Science Application, pp. 90-105.

Net Bill: An Internet Commerce System Optimized for Network Delivered Services.

Article from American Bankers, May 5, 1995, , "A Player Goes After Big Bucks in Cberspace".

Article from First USA Bank Confidential and Proprietary, dated Apr. 2, 1999, "Summary of the At Your Request Architecture".

Web page, "What is COBRA?", printed May 25, 1999.

Asch, Latimer, How the RMAIFair, Isaac credit-scoring model was built, Journal of Commercial Lending, vol. 77, No. 10, pp. 10-16, Jun. 1995.

Taylor, Clair et al., Card Issuers Turn to Scoring as They Face Increasing Risk, Financial Services Report, vol. 8, No. 15, p. 1, Jul. 24, 1991.

Roger, John C. et al., A Credit Scoring Model to Evaluate the Credit Worthiness of Credit Card Applicants, Developments in Marketing Science, vol. 5, 1982.

Hickman, Michael, Using Software to Soften Big-Time Competition, Bank Systems & Technology, vol. 31, No. 8, pp. 38-40, Jun. 1994.

Sullivan, Deidre, Scoring Borrower Risk, Mortgage Banking, vol. 55, No. 2, pp. 94-98, Nov. 1994.

Jameson, Ron, Expanding Risk Management Strategies: Key to Future Survival, vol. 84, No. 5, Credit World, pp. 16-18, May 1996.

Friedland, Marc, Credit Scoring Digs Deeper into Data, Credit World, vol. 84, No. 5, pp. 19-23, May 1996.

Credit Scoring New Markets, Bank Technology News, vol. 9, No. 7, p. 1, Jun. 1996.

Carey, James J., The Sub-Prime Credit Market: Identifying Good Risks for Unsecured Cards vol. 85, No. 1, Credit World, pp. 13-15, Sep. 1996.

Opportunity Knocks at Scoring's Door, Collection & Credit Risk, vol. 2, No. 4, Apr. 1997.

Makuch, Willaim J., Managing Consumer Credit Delinquency in the US Economy: A Multi-Billion Dollar management Science Application, Interfaces, pp. 90-109, Feb. 1992.

Fred Fortner, There Must be a Better Way, Mortgage Banking vol. 53, No. 2, pp. 12-22, Nov. 1, 1992.

* cited by examiner

Program List

| | 420 | 430 | 440 | 450 |
|---|---|---|---|---|
| | Program Description | Elig | Excl | Status |
| 410 → | Program 1 | Y | | Not Offered |
| | Program 2 | Y | Y | Not Offered |
| | Program 3 | N | Y | Not Offered |
| | Program 4 | N | | Not Offered |
| | | N | | Not Offered |
| | | N | | Not Offered |

| | Program Description | Excl | Status |
|---|---|---|---|
| 460 → | Program 5 | Y | Not Offered |
| | Program 6 | Y | Not Offered |
| | | Y | Not Offered |
| | Select | | Close |

SYSTEM AND METHOD FOR DETERMINING ELIGIBILITY AND ENROLLING MEMBERS IN VARIOUS PROGRAMS

RELATED APPLICATIONS

This application is related by subject matter to U.S. patent application Ser. No. 09/391,460, filed Sep. 8, 1999, entitled "Financial Advice Strategy System," incorporated herein by reference.

BACKGROUND OF THE INVENTION

1. Field of the Invention

The present invention relates generally to a system and method for determining eligibility and enrolling eligible persons, such as credit card members, into appropriate programs, such as programs for the payment of past due or overdue accounts.

2. Description of the Prior Art

Credit cards allow users to receive immediate credit from the credit card issuer by purchasing items using the credit card, and then repaying the credit card issuer for the purchased items at a later date. Many credit card issuers (or "issuers") extend additional credit to credit card members (or "credit card holders" or "card holders") by permitting monthly payments of less than the total balance of the credit card account, in exchange for the payment of interest by the credit card member for the remaining balance of the credit card account. A credit card issuer may require minimum monthly payments from a credit card member to ensure that the balance on the credit card account is eventually paid in full.

Some credit card members are unable to pay even the minimum monthly payments to the credit card issuer and thus become delinquent. Various hardships, such as divorce, illness, loss of employment or reduction in income, may prevent a credit card member from making the required payments. Credit card members may also be prevented from making appropriate payments due to other obligations, such as mortgages, loans, and other credit card payments. Credit cards have become very widely used due to their ease of use, relative security, and extension of immediate credit. Thus, there is an increased number of delinquent credit card members.

As a result, many credit card issuers design payment programs for delinquent credit card members. The payment programs are often tailored to suit particular categories of hardships and circumstances such as those mentioned above. The card members are asked to commit to payment programs which suit them best, and still satisfactorily repay their debt to the issuer. Providing tailored payment programs encourages card members to make a commitment to repay. Card members are more likely to complete the payment programs if the requirements of the programs are matched with some of their particular needs.

Unfortunately, there are numerous shortcomings with existing payment program eligibility and enrollment systems. Credit card issuers may have difficulty determining which payment programs are appropriate and best for a particular card member, and then may have trouble committing the card members to enroll in the program. Issuers also have difficulty designing effective payment programs. These are significant drawbacks.

One problem may arise when some card members who are not eligible for a particular payment program are mistakenly offered that program anyway. Conversely, another problem may arise when a card member who is eligible for a payment program is not offered that program. Different payment programs may have certain initial conditions to be eligible for enrollment. For example, a payment program may have as an initial condition for eligibility that the delinquent card member has recently lost his or her job. Thus, some payment programs may be appropriate for some card members, but inappropriate for others. The issuer may not always apply correct and uniform standards for determining eligibility for the payment programs. Another problem may also arise when card members are offered one payment program when another payment program would have been more beneficial to the card issuer. In circumstances where a card member is eligible for more than one payment program, some of the payment programs may be more beneficial to the card issuer than others. These are all significant drawbacks to conventional eligibility and enrollment programs.

Another problem with prior art systems is determining in a timely manner those programs for which a card member is eligible for enrollment. The issuer may be required to obtain various information from a card member to determine if the card member is eligible for a particular program. Obtaining this information and determining eligibility may be a lengthy process. This inconvenience has the effect of discouraging the card member from enrolling in a payment program. The inconvenience taxes the issuer's resources as well. If a card member requests information on several payment programs before committing to any of them, then the inconvenience for both parties is compounded. Therefore, current systems discourage some card members from enrolling and are also burdensome for the card issuer.

Another drawback of current systems is obtaining feedback on which payment programs are most effective. The most effective payment programs both entice the card members and lead to repayment of the greatest possible portion of money owed to the card issuer. Current systems do not provide feedback about which programs perform well based on these two factors.

Other problems and drawbacks also exist. Although the problems and drawbacks of the prior art have been discussed in relation to a system and method for enrolling delinquent card members in repayment programs, these same problems and drawbacks exist in other systems for enrolling members.

SUMMARY OF THE INVENTION

An object of the invention is to overcome these and other existing drawbacks of present systems and methods.

Another object of the invention is to provide a system and method for accurately and consistently determining eligibility and enrolling persons in appropriate programs.

Another object of the invention is to provide a system and method for rapidly and easily determining eligibility and enrolling persons into appropriate programs.

Another object of the invention is to provide a system and method for providing feedback about which programs are the most enticing and useful to members.

Other objects and advantages of the present invention are explained below.

According to the invention, a program is selected, after which enrollment information is entered. The enrollment information is checked and verified, and the enrollment applications are checked for eligibility. The enrollment may be either accepted or declined. The possibility of reiterative enrollment in more than one program is provided. A system is provided for tracking which payment programs are the most enticing for later feedback analysis.

DETAILED DESCRIPTION OF THE INVENTION

The present invention involves a system and method for determining eligibility in various enrollment programs. To assist in the explanation of the invention, a specific implementation thereof will now be described. In one embodiment of the invention, a system for determining eligibility and enrollment in credit card repayment programs assists a customer service representative ("CSR") who is speaking with the credit card members over a telephone. The system aids the CSR by determining which of several repayment programs is available to the member for enrollment and by providing the result to the CSR. The system also provides the CSR with information regarding each repayment program and prompts for other information which is required for enrollment in each repayment program. For example, the system may inform the CSR that a particular repayment program is intended only for those members suffering a hardship because of a lost job, and that enrollment in the program requires committing to a minimum monthly payment. Once the CSR has entered the member's enrollment information, the system checks to ensure that the information is correct or within acceptable ranges. For example, the system may check to see if the minimum monthly payment is within an acceptable range for the debt-level of the member. If all the information is acceptable, the system prompts the CSR to accept enrollment of the member in the repayment program. If enrollment is accepted, the system can update databases to record the enrollment and take other steps according to the repayment program plan. For example, the system may spawn the creation of a letter to the member confirming the enrollment and the minimum monthly payment that was agreed upon.

Figure 1:
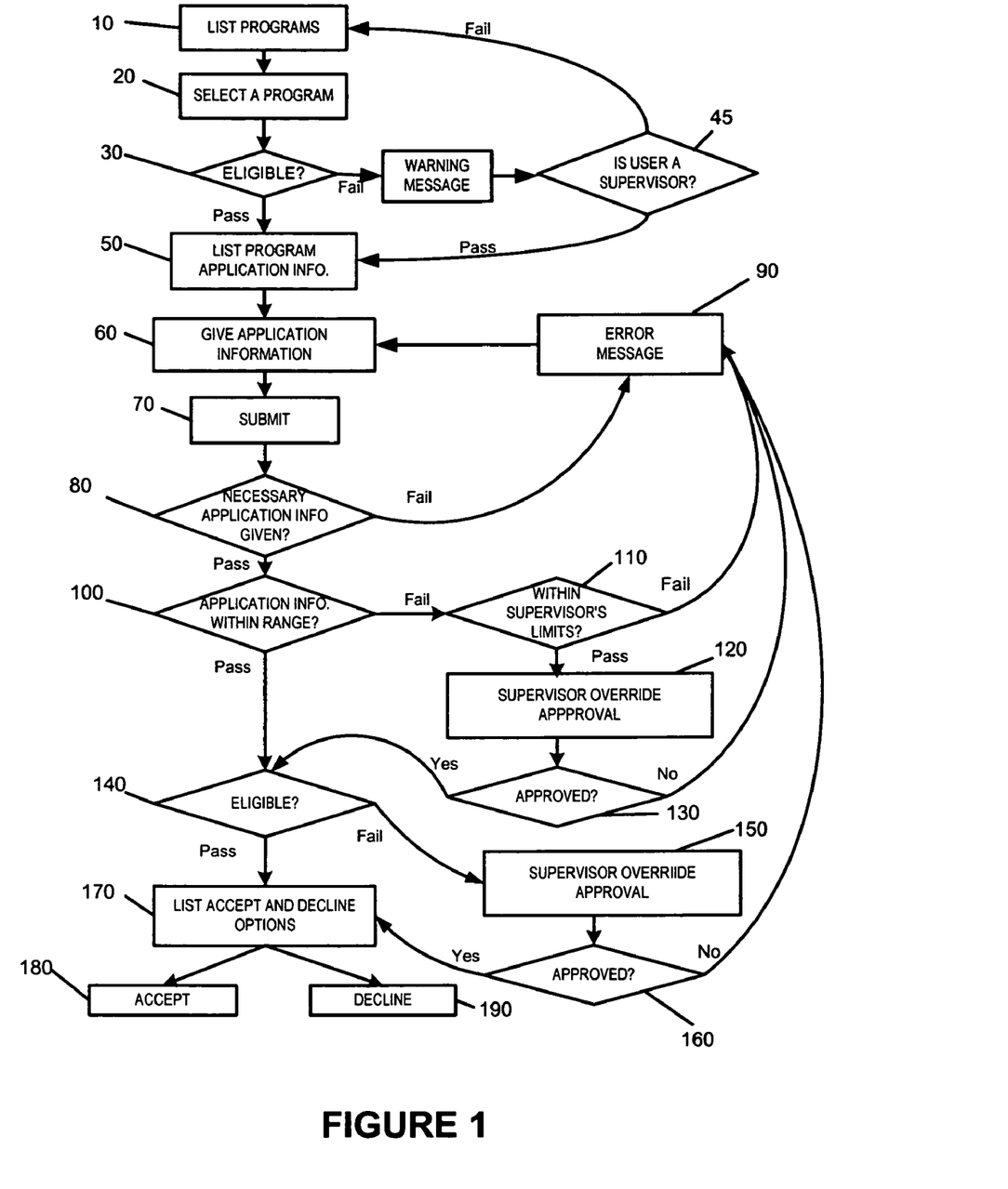
FIG. 1 is a flowchart of a method for determining eligibility and enrolling persons into appropriate programs according to a first embodiment of the present invention.

Having explained a specific implementation of the invention, a more general implementation will now be described. FIG. 1 illustrates a method for determining eligibility and enrolling persons in appropriate programs according to a first embodiment of the invention. At step 10, the available programs are listed. The available programs are all of the programs offered, regardless of eligibility. The programs may be listed in an order of decreasing desirability of enrolling a person in the program. In other words, the program which it is most desirable for the person to be enrolled in may be listed first on the list. One of the programs from the list is selected at step 20. Eligibility of a person to enroll in the selected program is determined at step 30. If the person is eligible to enroll at step 30, the program application information is immediately listed at step 50. Alternatively, if the person is not eligible, a warning message may be given at step 40, and it is determined whether the user is a supervisor (or another with authority to explore enrollment in ineligible programs) at step 45. If the user is not a supervisor, the available programs are again listed at step 10. If the user is a supervisor, program application information is listed at step 50. At step 60, information is collected for completing the application. The information collected for the application is submitted at step 70. At step 80, it is determined whether all of the necessary program application information has been submitted. If all of the necessary program application information has not been submitted, an error message is given at step 90, and program application information may be solicited at step 60 again. If all of the necessary program application information has been submitted, it is determined at step 100 whether the program application information is within a normal acceptable range. If any of the program application information is not within a normal acceptable range, it is determined at step 110 whether the values fall within a supervisor's override range. If any of the application information does not fall within a supervisor's override range, an error message is given at step 90. If all of the application information falls within a supervisor's override range, then a supervisor's override approval is solicited at step 120. At step 130, it is determined whether the supervisor's override is approved by a supervisor. If the application information override is not approved by a supervisor, an error message is given at step 90. If the application information override is approved, it is determined whether the person is eligible for the program at step 140. Also, if the application information does fall within a normal acceptable range at step 100, step 140 is performed. If it is determined that the person is not eligible for the program at step 140, a supervisor override is solicited at step 150. It is determined whether a supervisor's override approval has been obtained at step 160. If a supervisor's override approval is not obtained, then an error message is given at step 90. If a supervisor's override approval is obtained, or if the person is determined to be eligible for the program at step 140, then accept and decline options are given at step 170. The person either chooses to accept the program at step 180 or decline the program at step 190. After step 180 or 190, the application is closed and the enrollment is completed.

The method for determining eligibility and enrolling persons in appropriate programs explained above may be practiced in several different ways. According to an embodiment of the invention, the method may be practiced when the person enrolling speaks to a customer service representative ("CSR") on the telephone. A software application may aid the CSR and the person enrolling. The software application may display on the CSR's computer terminal the list of programs according to step 10, described above. The CSR and the person enrolling may interact over a telephone, where the CSR reads the list of programs to the person enrolling, who may then provide a program selection to the CSR according to step 20, described above. The CSR enters the enrolling person's selection into the CSR's computer terminal, and the software application may perform a routine to determine the enrolling person's eligibility according to step 30, described above.

According to another embodiment, the above method may be practiced through the Internet. The person enrolling views a web page where a software application, implementing the above method, causes to be displayed on the web page the list of programs according to step 10, described above. The person enrolling selects a program for enrollment and submits his or her selection, using the web browser, to the web server according to step 20, described above. The web server submits the enrolling person's selection to a software routine where the eligibility of the person to enroll in that program is determined according to step 30, described above. According to this way of practicing the method, a CSR is not required, but may nonetheless be used.

According to a further embodiment, the above method may be practiced by communicating with an automatic voice messaging and information gathering system over a telephone. Such systems are sometimes referred to as "automatic voice response" (AVR) or "voice response units" (VRU). The automatic voice messaging system could speak to the person enrolling, over the telephone, the list of programs according to step 10, described above. The person enrolling could submit to the automatic voice messaging and information gathering system his or her program choice according to step 20, described above, by pushing a key on his or her telephone keypad or by speaking a number, which selection would be recorded by the automatic voice messaging and information gathering system. A software application for the above method could then receive the enrolling person's program selection and determine the enrolling person's eligibility for the program according to step 30, described above. These are but a few examples of the ways in which the above method for determining eligibility and enrolling persons into appropriate programs may be practiced.

Figure 2A:
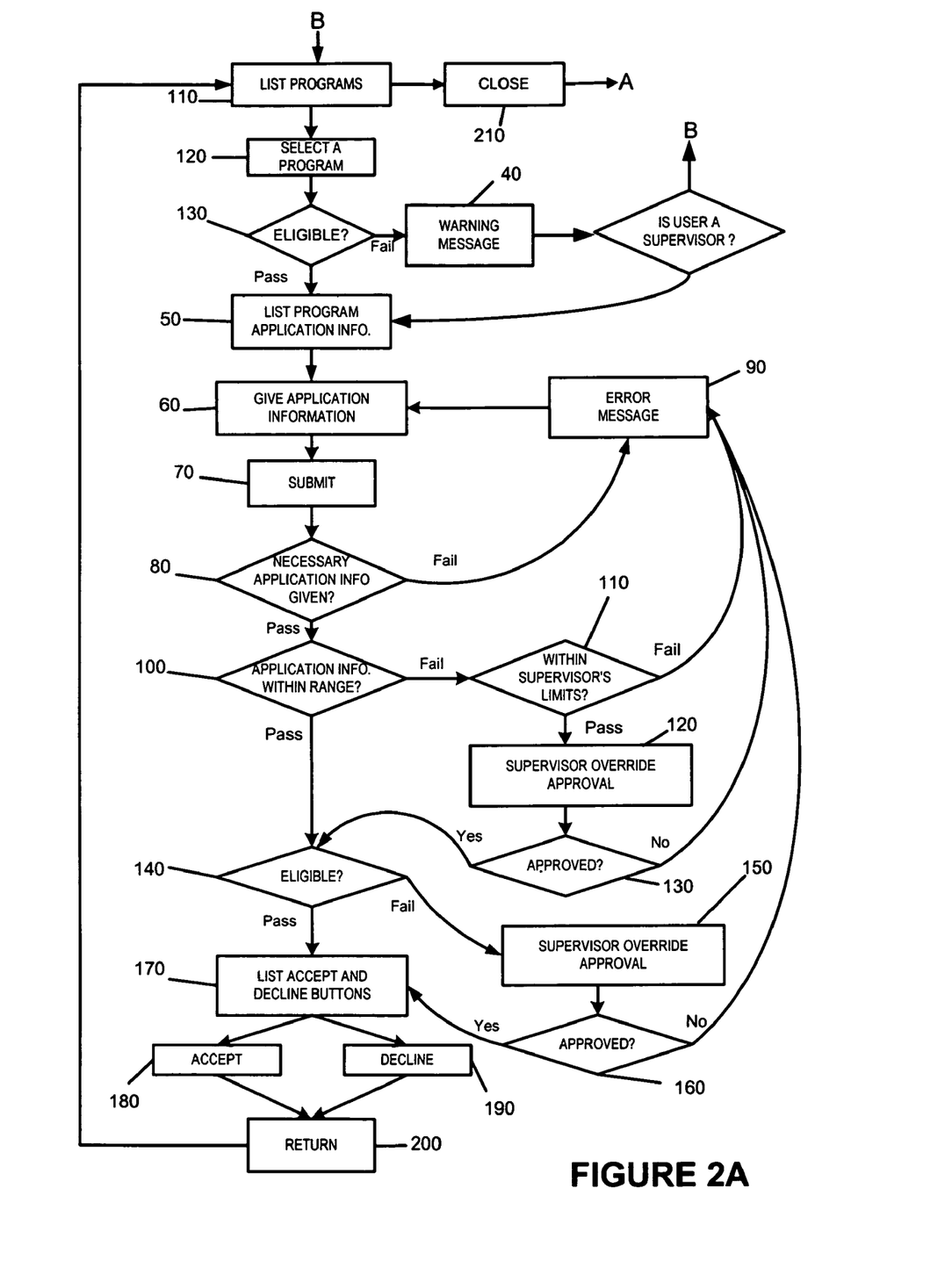
FIGS. 2A and 2B are flowcharts depicting a method for determining eligibility and enrolling persons into appropriate programs according to another embodiment of the present invention.
Figure 2B:
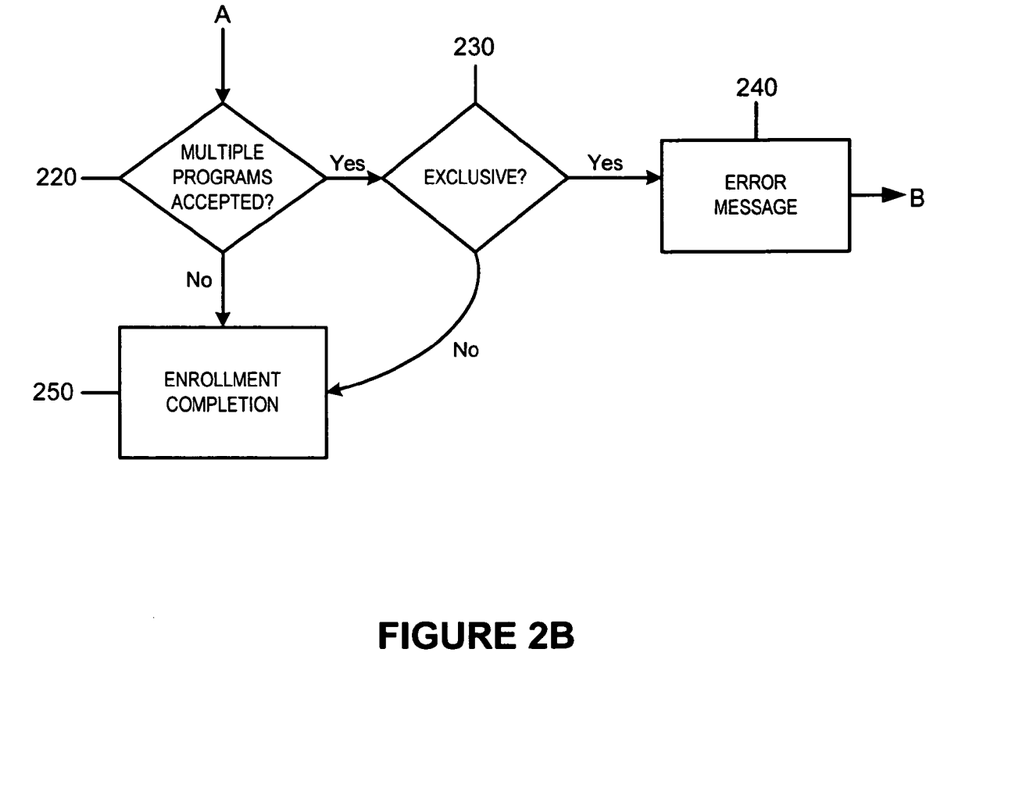

FIGS. 2A and 2B illustrate a method for determining eligibility and enrolling persons into appropriate programs according to another embodiment of the present invention. In this embodiment, more than one enrollment program may be selected through an iterative process. If enrollment in some of the programs is exclusive of other programs, then one or more programs must be declined before the enrollment is completed. This embodiment is similar to the previous embodiment except that, after the steps 180 and 190 of declining or accepting enrollment in a program, the method returns at step 200 to step 10, where the available programs are again listed. A person may select another program at step 20 and continue to follow the method as described previously. Thus, the method is iterative in that a substantially similar set of steps may be repeated several times in order to accept enrollment in one or more programs according to the method of this embodiment. At step 10, a close option may be selected at step 210, in which case the method proceeds to A in FIG. 2B.

Beginning at A in FIG. 2B, a determination is made whether there are multiple accepted programs at step 220. If multiple programs have been accepted, at step 230 a determination is made whether enrollment in any of the accepted programs is exclusive of enrollment in any other accepted programs. If enrollment in any of the programs is exclusive, then an error message is given at step 240, and the process then passes to B in FIG. 2A, where the available programs are again listed according to step 10, described above. If it is determined that there are not any accepted programs which are exclusive of any other accepted programs, then the enrollment is completed at step 250.

The enrollment completion step 250, described above, may comprise steps for recording which programs were accepted and which programs were declined. When this information is recorded for each person involved in enrollment in the programs, the information can be gathered together and later studied to help determine which programs are the most enticing programs to enrolling persons, and, based on repayment performance, which are the most effective programs.

A further embodiment of a method for determining eligibility and enrolling members in various programs according to the present invention will now be described in connection with FIGS. 3A and 3B. This particular embodiment is suited for determining the eligibility of and enrolling credit card members in payment programs. This particular embodiment is also suited to be practiced with a software application that has been created to help either a CSR or a credit card member follow the method.

Figure 3A:
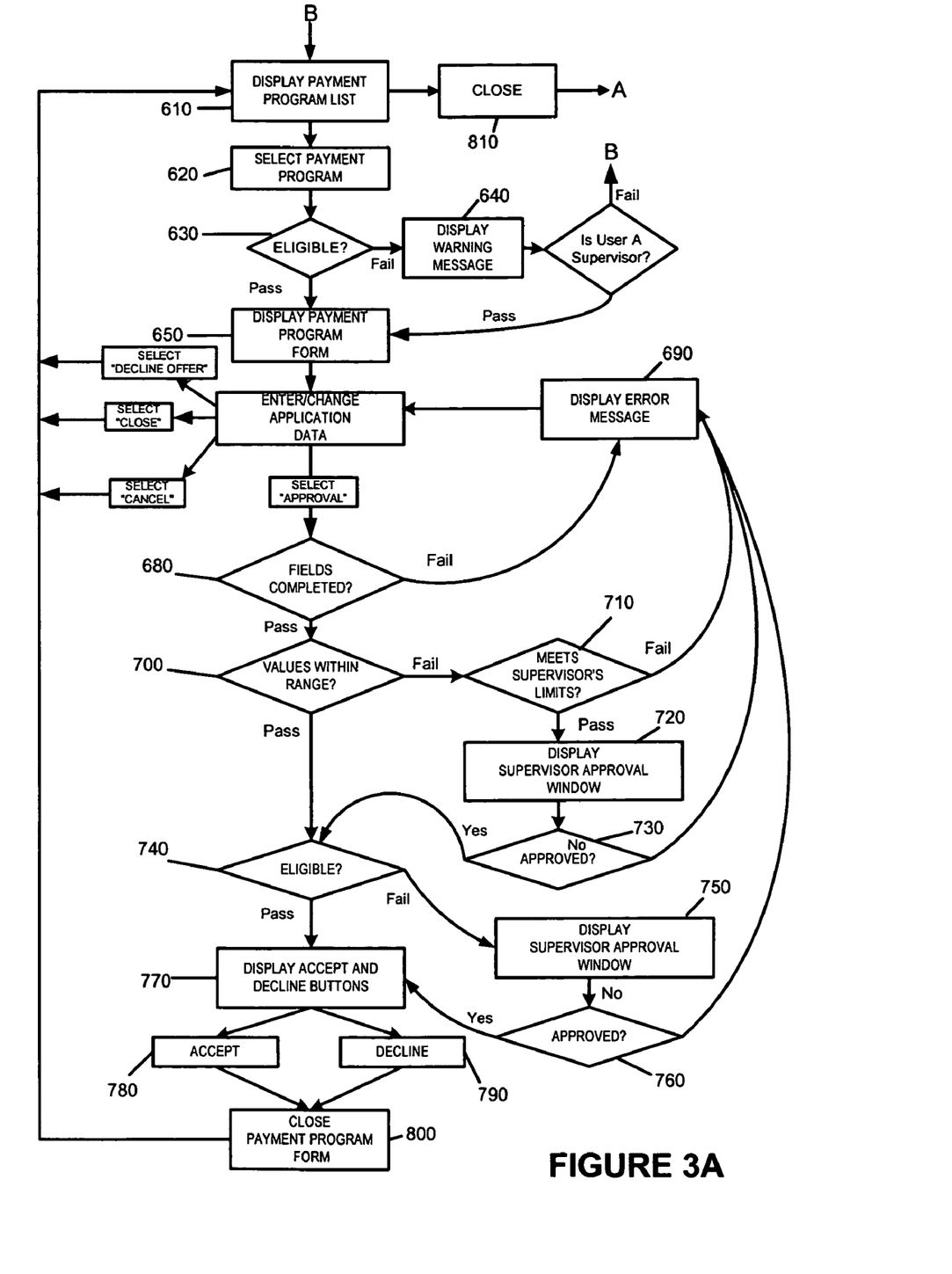
FIGS. 3A and 3B are flowcharts depicting a method for determining eligibility and enrolling persons into appropriate programs according to another embodiment of the present invention.
Figure 4:
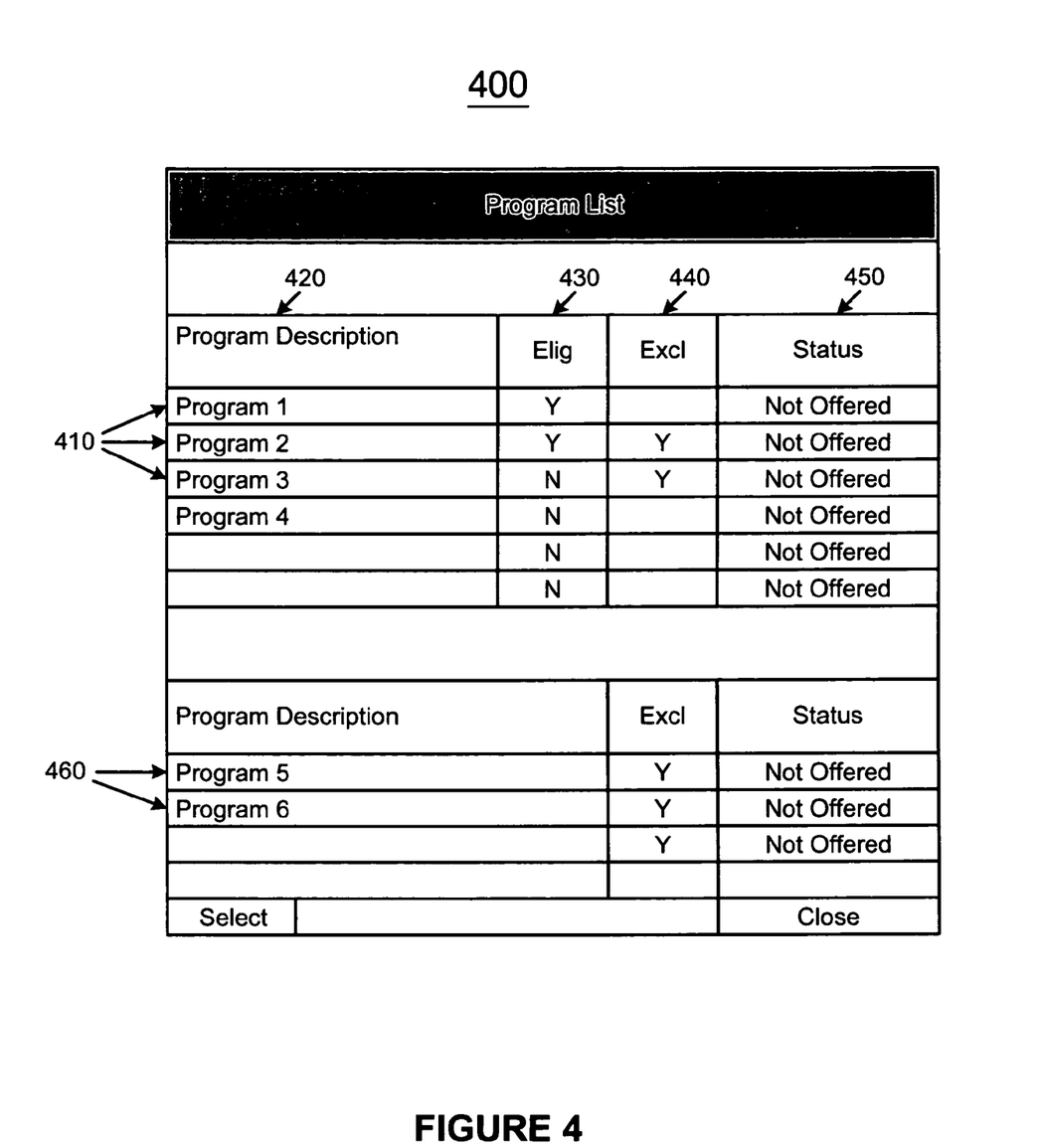
FIG. 4 is an exemplary sample graphical user interface for use in practicing the method according to an embodiment of the invention.

In this embodiment a list of payment programs will be displayed on a graphical user interface, according to step 610, FIG. 3A. A schematic example of a graphical user interface 400 including a list of payment programs is illustrated in FIG. 4. In this example of a payment program list, the different payment programs available for enrollment are displayed in rows 410. The payment program list includes a column 420 providing a description of each payment program. The list may also include other columns providing other information for the programs. For example, a column 430 may provide information on whether the member is eligible for that particular payment program. Another column 440 may provide information on whether the payment program is exclusive of other payment programs. Another column 450 may include information on whether the payment program was offered to the member in the past, and if so, whether the program was accepted or declined. Rows 460 may also be included and will display programs grouped according to another criteria. For example, rows 460 may display programs for which there are no eligibility requirements—all members are eligible for these programs.

This program list also includes two option buttons: "select" and "close." By selecting the "select" button, a program, previously preliminarily selected by the user through a method such as highlighting, is finally selected, according to step 620, FIG. 3A. By selecting the "close" button, the iterative process of selecting and enrolling in payment programs ends, according to step 810. Buttons may be selected using conventional manners of selection (e.g., clicking on a button with a mouse).

At step 630, an eligibility check is performed to determine if the member is eligible for the payment program selected in step 620. For example, eligibility to enroll in a particular payment program might be limited to credit card members who owe less than a predetermined amount to the issuer. If the enrolling person is determined to be eligible for enrollment at step 630, the program form is immediately displayed at step 650. Alternatively, if the enrolling person is not eligible for enrollment, then a warning message will be displayed at step 640. At step 645, it is determined if the user is supervisor (or another person permitted to proceed with an ineligible application). If the user is not a supervisor, then the program list is displayed at step 610. If the user is a supervisor, then the program form is displayed at step 650. Application data is entered into the application at step 660.

Figure 5:
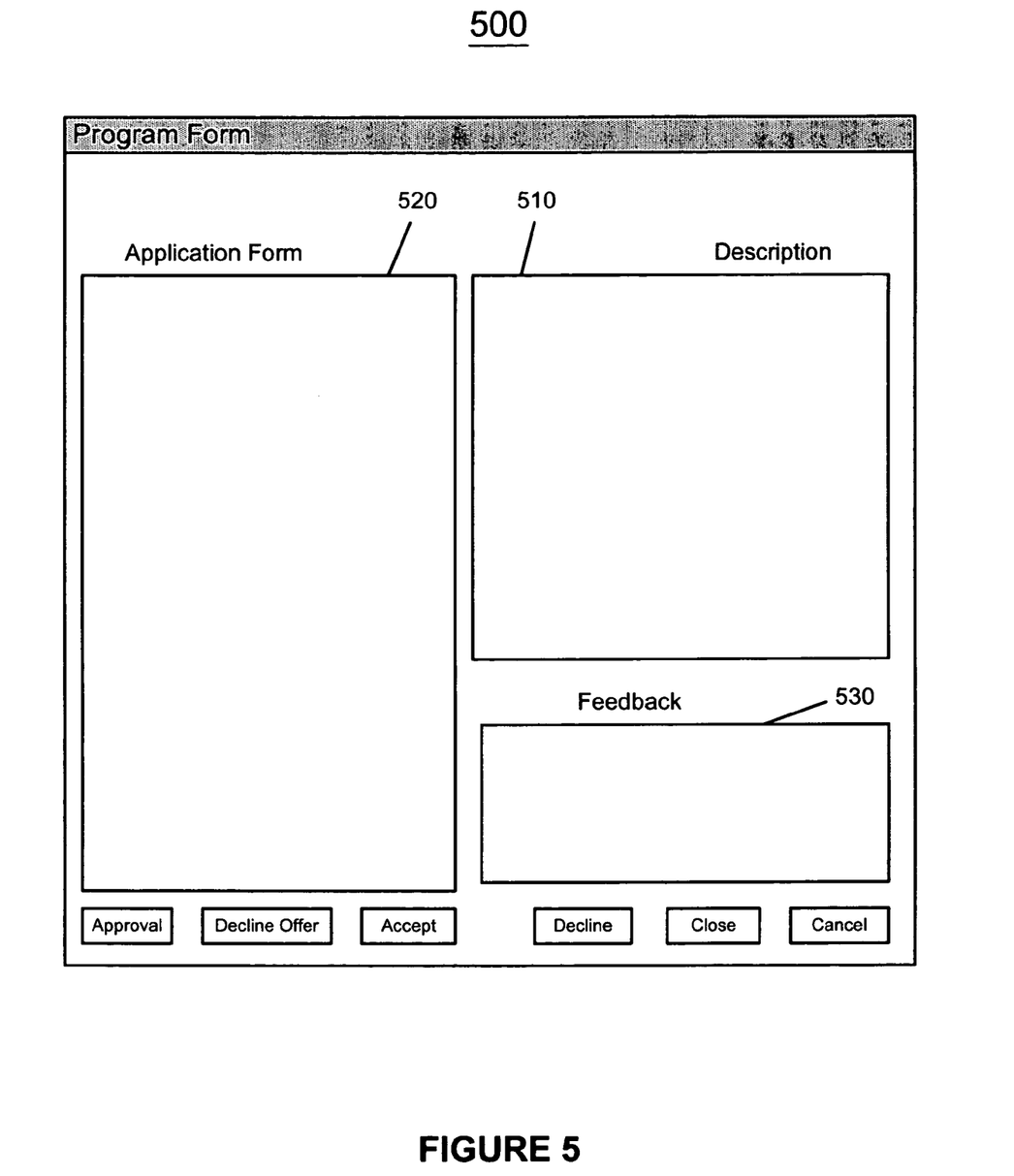
FIG. 5 is an exemplary sample graphical user interface for use in practicing the method according to an embodiment of the invention.

FIG. 5 schematically illustrates one example of a graphical user interface 500 containing a program form according to the present embodiment of the invention. In this example, the program form contains a description area 510, an application form area 520, and a feedback area 530. The description area 510, the application form area 520, and the feedback area 530, will be pertinent to the particular payment program selected in step 620. In the description area 510, information about the payment program is displayed. This information might include a description of the card members who are best suited for the payment program, advantages of the payment program, and other useful information. In the application form area 520, payment program enrollment information is solicited and entered, and may be organized into distinct fields to facilitate entering and gathering the enrollment information. The options may include payment amounts, payment dates, interest rates, etc. In the feedback area 530, feedback about the enrollment process may be displayed. For example, after submitting the enrollment information for a program for approval, the status of the approval, whether it is approved or denied, may be displayed in the feedback area 530.

The program form may also comprise six option buttons: "approval," "decline offer," "accept," "decline," "close," and "cancel." If the card member is not interested in enrolling in the payment program after the program form has been displayed and the payment program has been explained to the card member, selecting the "decline offer" button will close the payment program form and the payment program list will again be displayed. By selecting the "close" button, the payment program form is closed, but any payment program enrollment information already entered in the application form area 520 is retained for possible future use. By selecting the "cancel" button, the payment program form is closed and no information contained in the form is retained.

After completing the payment program enrollment information in the application form area 520, choosing the "approval" button will submit the enrollment information in the application form 520 area to be checked to determine if all of the necessary fields have been completed, according to step 680, FIG. 3A. If all of the necessary fields have not been completed, an error message is displayed at step 690, and payment program enrollment information may be completed at step 660 again. If all of the necessary fields have been completed, it is determined at step 700 whether the payment program enrollment information is within a normal acceptable range. For example, if a monthly payment amount is included in the payment program enrollment information to be entered in step 660, then there may be a requirement for a minimum amount for the monthly payment. At step 700 it would be determined if the monthly payment amount entered at step 660 meets the minimum monthly payment requirement. If any of the payment program enrollment information is not within a normal acceptable range, it is determined at step 710 whether the information falls within a supervisor's override range. If any of the payment program enrollment information does not fall within a supervisor's override range, an error message is displayed at step 690. If all of the payment program enrollment information falls within a supervisor's override range, then a supervisor's override approval is solicited at step 720. At step 730, it is determined whether the supervisor's override is approved by a supervisor. If the supervisor's override is not approved by a supervisor, an error message is displayed at step 690. If the supervisor's override is approved, it is determined whether the member is eligible for the payment program at step 740. Also, if the payment program enrollment information does fall within a normal acceptable range at step 700, step 740 is performed. If it is determined that the member is not eligible for the payment program at step 740, a supervisor's override is solicited at step 750. It is determined whether a supervisor's override has been approved at step 760. If a supervisor's override is not approved, then an error message is displayed at step 690. If a supervisor's override is approved, or if the member is determined to be eligible for the payment program at step 140, then the "accept" and "decline" option buttons are displayed on the program form at step 770.

By selecting the "decline" button at step 790, enrollment in the payment program is not accepted and the payment program form is closed at step 800. By selecting the "accept" button at step 780, enrollment in the payment program is accepted by the card member and the payment program form is closed at step 800. The program list is then again displayed at step 610.

In this embodiment, as in the embodiment depicted by FIGS. 2A and 2B, one or more payment programs may be viewed, approved, and enrolled in during an iterative enrollment session. When it is desired to complete the enrollment session, the "close" option button is selected at step 810 and the iterative session stops. A check is performed at 820, FIG. 5 to determine if the card member has enrolled in more than one payment program. If the card member has enrolled in more than one payment program, it is further determined at 830 whether any of the payment programs are exclusive of other payment programs. If any of the payment programs are exclusive of other payment programs, an error message is displayed at 840. After the error message is displayed at 840, the program list is again displayed at 610, FIG. 3A. This allows one or more of the enrolled-in payment programs to be selected at step 620, and for enrollment in that payment program to be declined by following the method explained above and selecting the "decline" button at step 790. This process will resolve any conflicts between mutually exclusive payment programs detected at step 830. If multiple payment programs are not detected at step 820, or if no exclusive payment programs are detected at 830, then enrollment will be completed at step 850.

Figure 6:
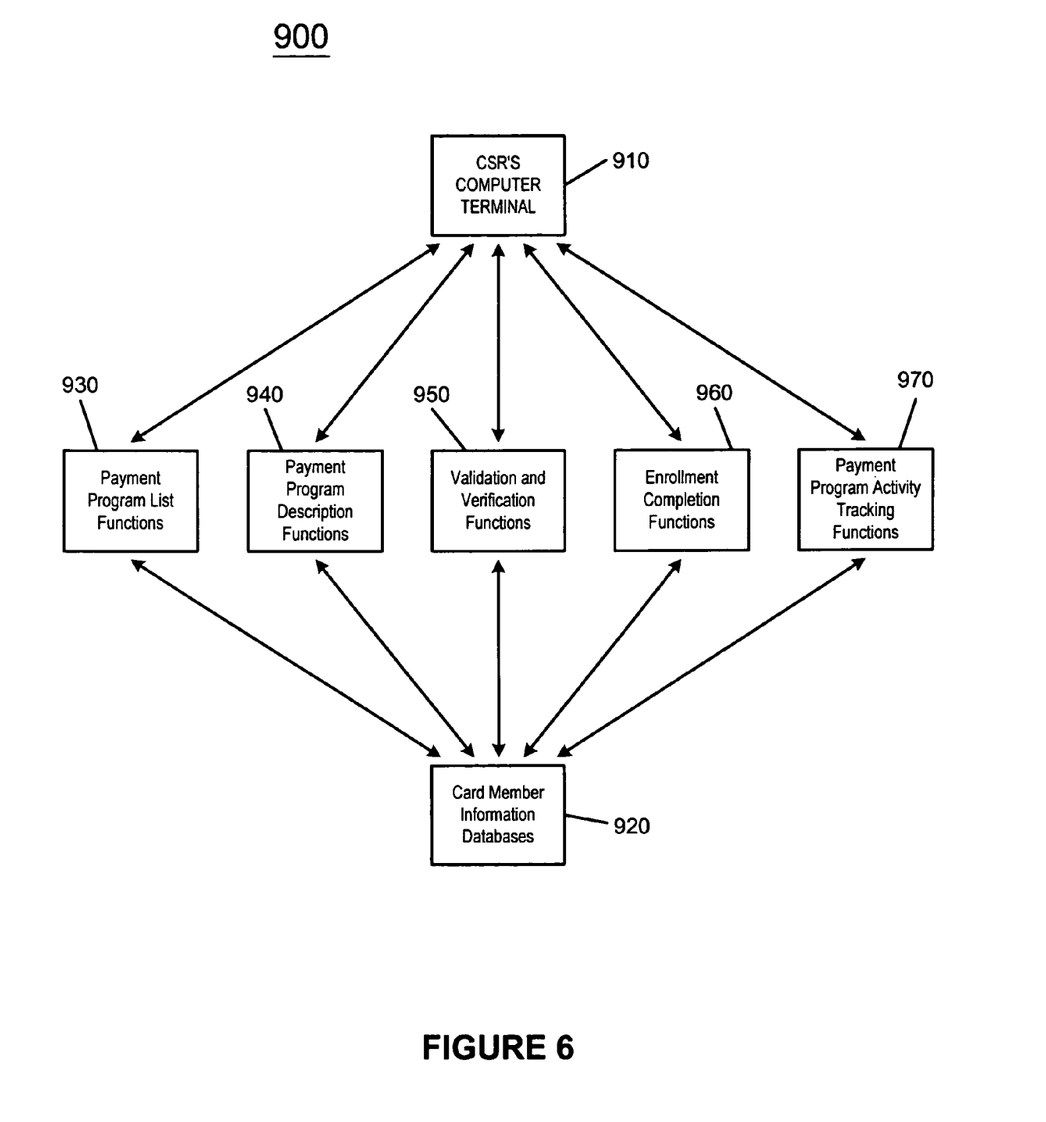
FIG. 6 is a schematic diagram representing a system for practicing the method according to an embodiment of the invention.

FIG. 6 schematically depicts a system 900 used to practice the method of the third embodiment. The system 900 comprises a CSR's computer terminal module 910, information database module 920, payment programs list module 930, payment program description module 940, validation and verification module 950, enrollment completion module 960, and payment program activity tracking module 970. The CSR's computer terminal module 910 may include a CPU, a screen, a keyboard, etc., as is well known. The information database module 920 may comprise computer readable databases which may be stored on the CSR's computer terminal, or in another computer separate from the CSR's computer terminal but connected to the CSR's computer terminal through an information sharing network. Various processing modules 930, 940, 950, 960, and 970 are designed to effectively share and process information between the information databases 920 and the CSR's computer terminal module 910 according to predetermined functions. These modules may be defined by computer readable code stored and executed on the CSR's computer terminal module 910 or on another computer separate from the CSR's computer terminal module 910 but connected to the CSR's computer terminal through an information sharing network such as a LAN, WAN, Internet, or similar network.

The payment program list module 930 will aid in the displaying of the payment program list according to step 610, FIG. 3A. As previously explained, the payment program list includes a list of the available payment programs, and may further include information on whether a card member is eligible for the payment programs, whether the card member is already enrolled in a payment program, or has been offered a payment program but previously declined, or whether a payment program is exclusive of other payment programs. The payment program list module 930 may aid in the displaying of the payment program list by providing information from the information databases 920 to the CSR's computer terminal 910 to help populate the payment program list. The payment program list module 930 may also categorize the payment programs in an order from the most desirable to the least desirable, based upon predefined strategies.

The payment program description module 940 will aid in the displaying of the payment program description window according to step 650, FIG. 3A, and as illustrated in exemplary FIG. 5. As previously described, the payment program description window may include descriptive information about the selected payment program. The descriptive information may include information customized to the enrolling card member. For example, the descriptive information may include suggested payment dates, and the suggested payment dates may be based upon the billing cycle for the enrolling card member. Or, the descriptive information may include suggested payment amounts or interest rates, and the suggested payment amounts or interest rates may be based upon the enrolling card members account balance or previous interest rate. The payment program description module 940 will aid in the displaying of the payment program description window by providing information from the information databases 920 to help populate the payment program description window.

The validation and verification module 950 will aid in all of the data checking and determinations of the present invention (e.g., steps 680, 700, 710, etc. of FIG. 3A). The validation and verification module 950 provides information from the information databases 920 about normal ranges for payment program enrollment information, supervisor override ranges for payment program enrollment information, etc. The validation and verification functions may also provide information about the card member's account from the information databases 920 to aid in the data checking and determinations.

Figure 3B:
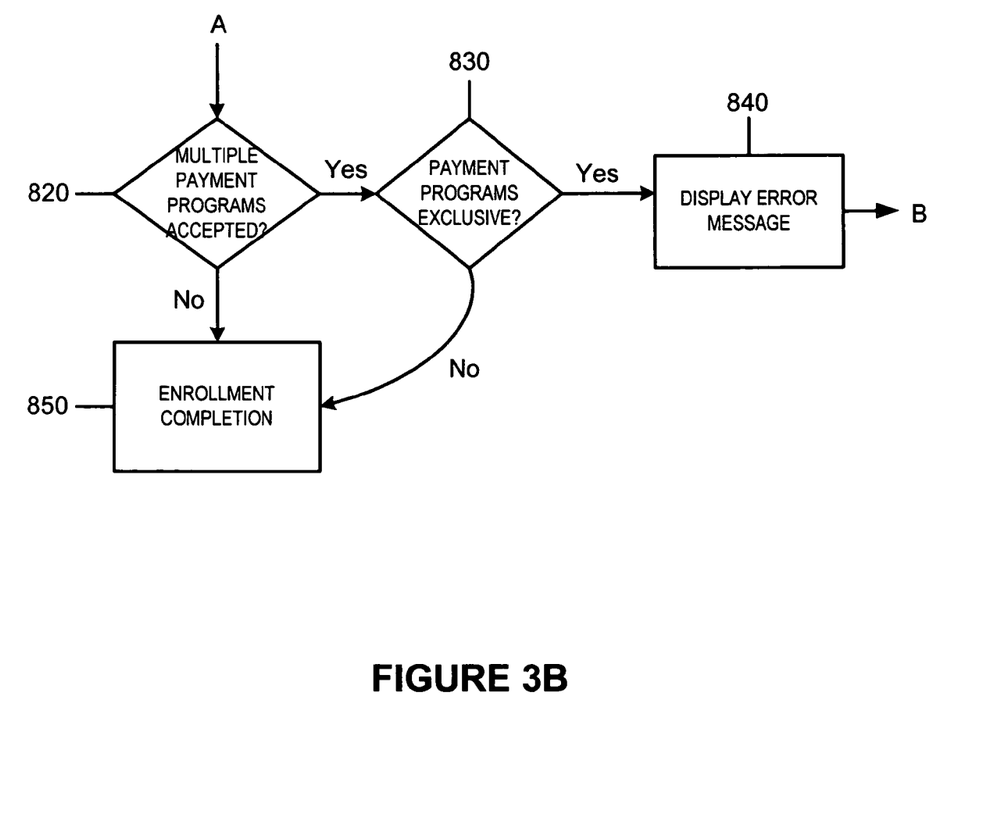

The enrollment completion module 960 will aid in enrollment completion, step 850, FIG. 3B. The enrollment completion module 960 may store information about payment program enrollment acceptance and payment program enrollment information in the information databases 920. The enrollment completion module 960 may also trigger the creation of letters to the card member, the transfer of funds between accounts, etc.

The account activity tracking module 970 may aid in determining which payment programs are the most enticing to card members and the most effective. The account activity tracking module 970 may store information in the information databases 920 about how many times each payment program is offered to card members and how often the payment program is declined or accepted or any other outcome which is desired to track.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

We claim:

1. A computer implemented method for enrolling an individual, who is delinquent in payments to a financial account, in a program wherein financial status information relating to the individual is known, comprising:

providing a list of payment programs to a user;

receiving, from the user, a selection of a payment program for the individual to enroll from the list of payment programs;

determining whether the individual is eligible to enroll in the selected payment program, by performing an evaluation with a processor based at least in part upon the financial status information of the individual;

providing information on the selected payment program to the user based on determining that the individual is eligible to enroll in the selected payment program;

receiving enrollment information for the selected payment program from the user;

determining whether the enrollment information meets a set of predetermined criteria for enrolling the individual in the selected payment program by performing an evaluation with a processor on at least part of the enrollment information;

providing the results of the evaluation of the enrollment information to the user; and receiving an acceptance or rejection of the enrollment of the individual in the selected payment program from the user when the enrollment information meets the criteria for enrolling the individual in the selected payment program.

2. The method according to claim 1 wherein providing a list of payment programs includes providing a list of payment programs in an order of decreasing desirability of enrolling the individual in the payment program.

3. The method according to claim 1 wherein determining whether the enrollment information meets a set of predetermined criteria for enrolling the individual in the selected program by performing an evaluation with a processor on at least part of the enrollment information further comprises:

verifying whether all of the enrollment information was received; and, verifying that the enrollment information satisfies predetermined requirements.

4. The method according to claim 1, wherein the payment programs are credit card debt repayment programs.

5. The method according to claim 1:

wherein after the receiving an acceptance or rejection of the enrollment of the individual in the selected program from the user, the method further comprises;

providing the list of payment programs and receiving a selection of a second payment program for an individual to enroll.

6. The method according to claim 5 further comprising:

receiving a selection of a close option wherein when the close option is selected the enrollment process is completed.

7. The method according to claim 1, wherein the user is a customer service representative serving the individual.

8. The method according to claim 1, wherein the user is the individual.

9. A method of enrolling an individual, who is delinquent in payments to a financial account, in a payment program using a computer system comprising:

receiving a list of payment programs from the computer system;

transmitting, to the computer system, a selection of a selected payment program from the list of payment programs;

receiving information about the selected payment program from the computer system, the information comprising a description of the selected payment program, and a list describing predetermined application data which is necessary to enroll in the selected payment program;

transmitting application data corresponding to the selected payment program to the computer system;

receiving a decision of whether the individual is eligible to enroll in the selected payment program, the decision being based upon at least the transmitted application data from the computer system; and, transmitting the individual's decision to enroll in the selected payment program to the computer system.

10. The method according to claim 9 wherein receiving a list of programs further includes:

receiving a list of payment programs in an order of decreasing desirability of enrolling the individual in each payment program; and, receiving information indicating whether the individual is eligible to enroll in each payment program.

11. The method according to claim 9, wherein the payment programs are credit card debt repayment programs.

* * * * *